United States Patent [19]
Pauli

[11] 3,896,405
[45] July 22, 1975

[54] SOLENOID VALVE WITH THREADED CORE TUBE

[75] Inventor: Jude A. Pauli, Florissant, Mo.

[73] Assignee: Emerson Electric Co., St. Louis, Mo.

[22] Filed: Sept. 3, 1974

[21] Appl. No.: 502,785

[52] U.S. Cl. .................. 335/281; 335/255; 251/129
[51] Int. Cl.² ............................................ H01F 3/00
[58] Field of Search ............... 251/129, 30, 76, 138; 335/281, 251, 255, 262, 278, 261, 240

[56] References Cited
UNITED STATES PATENTS

| | | | |
|---|---|---|---|
| 2,374,513 | 4/1945 | Vieth ............................ | 251/129 X |
| 2,735,967 | 2/1956 | Lewus ............................ | 335/251 X |
| 3,378,732 | 4/1968 | Dietz et al. ....................... | 335/255 X |
| 3,469,590 | 9/1969 | Barker ............................ | 251/129 X |
| 3,727,160 | 4/1973 | Churchill ......................... | 335/255 X |

Primary Examiner—G. Harris
Attorney, Agent, or Firm—Polster and Polster

[57] ABSTRACT

In a solenoid valve having a core tube and a top plug in the outer end of the core tube, at least one screw thread is formed on the core tube, accessible to a nut from the outer end, and conforming to and formed on a corresponding screw thread form on an external side surface of the top plug. A nut with a complementary internal thread is screwed down on the thread of the core tube to hold a solenoid coil in place.

7 Claims, 7 Drawing Figures

PATENTED JUL 22 1975  3,896,405

SOLENOID VALVE WITH THREADED CORE TUBE

BACKGROUND OF THE INVENTION

It is common in the solenoid valve art to provide a core tube of stainless steel or the like non-magnetic material around which a solenoid coil is mounted, and to mount a top plug or fixed armature part in the outer end of the core tube. The core tubes have been made either closed at the outer end by a wall integral with the side wall of the core tube or by a solid top plug, or have been provided with an opening. In the first arrangement, the top plug has been either pressed into place (see Boyle U.S. Pat. No. 1,807,191) or formed with an annular groove into which the core tube is formed, as in Zaleske et al., U.S. Pat. No. 3,262,027. The top plug in a core tube without an integral top wall has also been mounted in similar ways, by providing the top plug with a groove into which the core tube is formed, as shown in Gille, U.S. Pat. No. 2,114,961, and Goddard, U.S. Pat. No. 1,799,969, or by brazing or otherwise securing the top plug into the open end of the tube. In the core tube without an integral top wall, the top plug was usually arranged to receive a screw, or was provided with an upwardly projecting threaded stud to take a nut, by which screw or nut the solenoid coil or housing was mounted against movement in the lengthwise direction of the core tube. In the case of the close ended tube, the annular groove was utilized to receive a snap ring as in Zaleske et al, or a rubber grommet or a clip of the Tinnerman type, cf. Lodge, U.S. Pat. No. 2,853,264, was used when no groove was provided, to hold the solenoid coil or housing. The rubber grommet had the disadvantage of aging. The Tinnerman clip type has the disadvantage of tending to cut into the core tube which is made as thin as possible. The arrangement shown in Zaleske or in Riefler, No. 3,281,740 has the disadvantage that there is a limit to the snugness that the spring clip or plastic cap can impart as a practical matter, because manufacturing tolerances will not permit a uniformly tight fit. Accordingly, the solenoid coil or housing is likely either to be free to turn about the core tube or to prevent effective seating of the spring clip in the annular groove in the core tube, depending upon whether the height of the solenoid coil or housing is slightly less or slightly greater than the precise height desired. It is suggested in Price, U.S. Pat. No. 2,320,008, that a heavy sleeve can be used to house the armature of the solenoid valve, the sleeve being threaded at its outer end, but such a construction necessitates the use of a greater thickness of metal than is now considered desirable. A patent to Lemberger, U.S. Pat. No. 3,017,156, discloses an arrangement in which a core tube is formed around a top plug with an annular radially outwardly projecting shoulder at one end and is flared at its other end to mount a solenoid coil between the shoulder and the flared end. However, this arrangement does not lend itself to the usual valve body structure.

One of the objects of this invention is to provide a solenoid valve structure in which the solenoid coil or housing can be mounted tightly in spite of substantial variation in height of the coil or housing.

Another object of this invention is to provide such a structure which is easy to produce, economical, and rugged.

Other objects will become apparent to those skilled in the art in the light of the following description and accompanying drawing.

SUMMARY OF THE INVENTION

In a solenoid valve having a core tube mounted on a valve body and a solenoid coil mounted on the core tube intermediate the ends thereof, the core tube having a top plug in its outer end, the core tube is formed with a screw thread accessible to a nut from the outer end. The screw thread conforms to and is formed on a corresponding screw thread form on an external side surface of the top plug. Nut means engaging the screw thread on the core tube retain the solenoid coil or a solenoid coil housing on the core tube and fasten it tightly between the nut means and the valve body.

In the preferred embodiment, the screw thread form on the top plug is a land defined by a spiral groove, and the core tube is closed by an integral wall at its outer end.

DESCRIPTION OF THE PREFERRED EMBODIMENT

Figure 4:
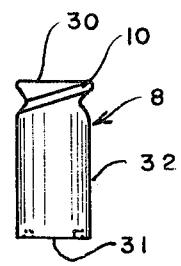
FIG. 4 is a view in side elevation of the top plug of the valve shown in FIGS. 1 and 2 before assembly with the core tube.

Referring now to FIGS. 1–6 of the drawing for one illustrative embodiment of solenoid valve of this invention, reference numeral 1 indicates a completed solenoid valve assembly which includes a valve body 2, a solenoid housing 3, a solenoid coil 4 within the housing 3, a core tube 5, and a retaining nut 6. The valve body has an internally threaded opening 20 with a stepped shoulder 21. An externally threaded keeper 22 with an annular seat 23 in which an O-ring 24 is caged, is screwed into the threaded opening 20, to mount an outwardly flared flange 25 of an inner open end of the core tube 5 against a radial surface of the shoulder 21 in a conventional manner. The flange 25 is integral with a cylindrical side wall 26 of the core tube 5.

A conventional moving armature part 7 is slidably mounted in the core tube 5, and a fixed armature part or top plug 8 is immovably mounted in the core tube 5 against an inside surface of a closed outer end wall 9 of the core tube. In this embodiment the closed outer end wall 9 is integral with a side wall 32 of the core tube.

The top plug 8 is cylindrical, with a flat top surface 30 perpendicular to the long axis of the cylindrical plug, a flat bottom surface 31, in which, in this embodiment, a conventional shading ring 28 is set, and a side surface 32 uninterrupted through a barrel portion 33, but interrupted from the top surface 30 to the outer edge of the barrel portion 33 by a thread 10. The thread 10 is formed by a spiral groove 11 defining a land 12, as shown particularly in FIG. 3. In the preferred embodiment shown, the groove 11 is defined by a cylindrical bottom surface 15 parallel with the surface of the barrel portion 33, and side walls 16. The resulting land 12 is shaped as an arc of a circle at its outer reaches, connected to the bottom surface 15 by tangents to the circle.

Figure 3:
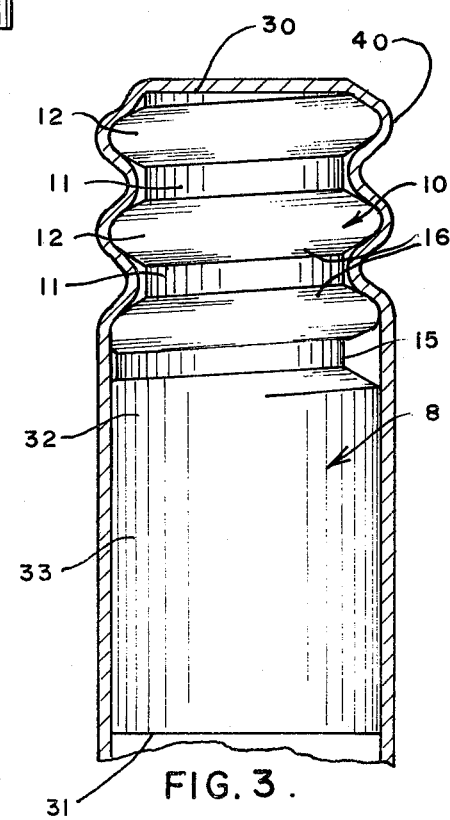
FIG. 3 is an enlarged fragmentary sectional view of the outer end of the core tube of the valve shown in FIGS. 1 and 2.

As is shown in FIG. 3, the core tube 5 is formed into the groove 11, over the land 12, to produce, from the closed end 9 a single screw thread 40 extending at least part way through the length of the thread 10 on the top plug. It can be seen that the land 12 serves as a screw thread form.

It can also be seen that the screw thread 40 has an external aspect, upon which the nut 6 is threaded, and an internal aspect which engages the screw thread form and is formed on and generally conforms to it.

Figure 2:
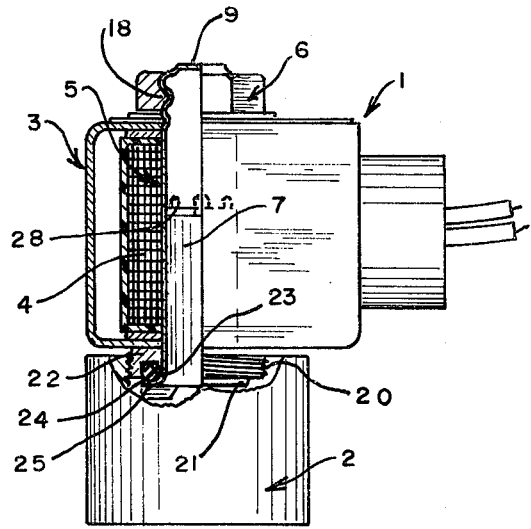
FIG. 2 is a view in side elevation, partly in section and partly broken away, of the valve shown in FIG. 1.

As is shown particularly in FIG. 2, the nut 6 has an internal thread 18 complementary to the thread 40 on the outer end of the core tube, which permits the nut 6 to be screwed down tightly against a top surface of the housing 3, to hold the housing tightly between the inner surface of the nut 6 and the outer surface of the keeper 22 in the embodiment shown.

Figure 1:
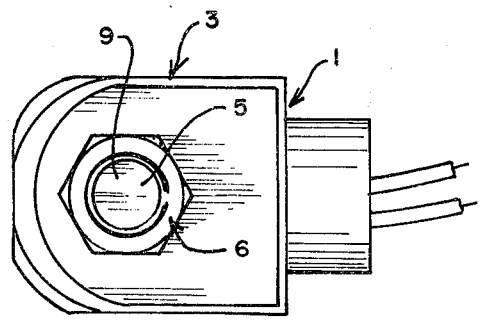
FIG. 1 is a top plan view of one embodiment of solenoid valve with a threaded core tube of this invention.
Figure 5:
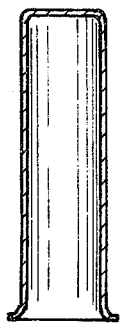
FIG. 5 is a longitudinal sectional view of the core tube before it is assembled with the top plug.
Figure 6:
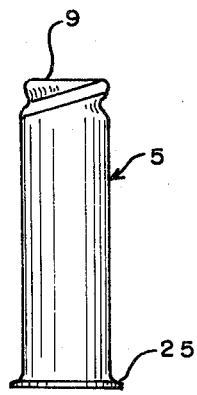
FIG. 6 is a view in side elevation of the assembled and formed core tube and top plug.

Referring now to the FIGS. 4 through 6, in the production of the core tube assembly shown in FIGS. 1 through 3, the top plug 8 is machined or otherwise formed with the single thread 10 extending from the top surface 30 as far as is desired to accommodate the nut 6 and provide ample accommodation for variations in manufacturing tolerances which affect the effective distance from the outer radial surface of the keeper 22 to the outer surface of the housing 3 or washer or name plate on the outer surface of the housing 3, as the case may be. The threaded top plug 8 is inserted into a drawn core tube, shown in FIG. 5, until the top surface 30 of the top plug engages the inner surface of the closed end 9 of the core tube. The side wall 26 of the core tube is then formed, hydraulically or by the use of an elastomeric sleeve, or otherwise mechanically, over the screw thread form (land) 12 of the core plug to produce the thread 40. The core tube assembly is then complete and ready for mounting.

Merely by way of illustration, the diameter of the cylindrical bottom 15, i.e., the root diameter of the thread 10, can be 0.340 inch in a top plug the barrel and land diameter of which is 0.450 inch. The width of the bottom can be 0.050 inch. The outer face of the land 12 can be formed on a 0.055 inch radius. The pitch can be 0.154 inch and the thread approximately eight turns per inch.

Figure 7:
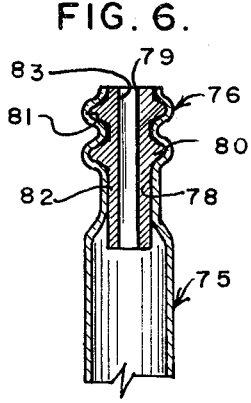
FIG. 7 is a longitudinal fragmentary sectional view of another embodiment of core tube assembly of this invention.

The core tube assembly shown in FIG. 7 illustrates a somewhat extreme example of different embodiment of this invention. In the embodiment shown in FIG. 7, a core tube 75 with an open outer end 79 is formed with a thread 76 in its side wall. The thread 76 is formed on a screw thread form on a side surface of a top plug 78. In this embodiment, the top plug 78 has a thread 80 in the form of an outwardly projecting helical rib 81. The top plug 78 has a barrel portion 82 which has a diameter substantially the same as the root diameter of the top plug thread 80. The top plug also has a passage 83 extending through it.

In forming the core tube assembly shown in FIG. 7, the top plug 78 is placed into a tubular, open-ended core tube with an inside diameter substantially the same as the outside diameter of the top plug thread 80, and the side wall of the core tube is then formed hydraulically or mechanically around the top plug, to produce the configuration shown in FIG. 7. An advantage of this type of arrangement is that the top plug is fixed against movement, and that the threaded portion of the core tube can begin at a point below the outer end of the core tube. A nut of the type used in connection with the first embodiment described can be used with the embodiment shown in FIG. 7.

Numerous variations in the construction of the solenoid valve of this invention within the scope of the appended claims, will occur to those skilled in the art in the light of the foregoing disclosure. Merely by way of example and not of limitation, the thread can be made multiplex as well as single. The pitch, coarseness or fineness, shape and direction of the thread or threads can be varied. A groove in the top plug in addition to the grooves which define the thread can be provided at a different angle from the thread upon which the nut is to be screwed, and the core tube formed into it to ensure that the top plug can not be backed out of the core tube, although the forming of the tube in the thread defining groove is sufficient except under extraordinary circumstances to ensure that the top plug will remain tightly fixed in the core tube. The thread of the embodiment in which the thread projects beyond the diameter of the barrel can be defined by a helix of wire, for example, brazed, welded or otherwise secured to the outer surface of a cylindrical top plug. The thread or threads can extend entirely from the top to the bottom surface of the top plug, and the core tube can be formed through the full length of the top plug. As is indicated in the embodiment shown in FIG. 7, the core tube can be open at its outer end. It can also be closed by a solid top plug or partly closed by inwardly flanging the core tube. Different kinds of nuts can be used, such as elastic lock nuts or speed nuts, spring or lock washers can be employed and the nuts can take shapes and sizes different from the one illustrated. These variations are merely illustrative.

Having thus described the invention, what is claimed and desired to be secured by Letters Patent is:

1. In a solenoid valve having a core tube and a top plug in an outer end of said core tube, said core tube having a thin, cylindrical side wall, the improvement comprising a screw thread form on a side surface of said top plug and at least one screw thread formed in said core tube side wall, said screw thread having an external aspect and an internal aspect, said external aspect being accessible to internally complementarily threaded nut means from the said outer end of said core tube, and the internal aspect of said screw thread engaging, formed on, and generally conforming to said screw thread form on said side surface of said top plug.

2. The improvement of claim 1 wherein the screw thread form comprises a land defined by a groove in said top plug.

3. The improvement of claim 1 wherein the said screw thread form is a projecting helical rib.

4. The improvement of claim 1 wherein the outer end of the core tube is closed by a wall integral with the said side wall of the core tube.

5. The improvement of claim 1 wherein the outer end of the core tube is closed by said top plug.

6. The improvement of claim 1 wherein the top plug has a passage through it.

7. In a solenoid valve having a core tube mounted on a valve body and a solenoid coil mounted on said core tube intermediate the ends thereof, said core tube having a thin, cylindrical side wall, and a top plug in an outer end of said core tube, the improvement comprising a screw thread form on a side surface of said top plug, at least one screw thread formed in said core tube side wall, said screw thread having an external aspect and an internal aspect, said external aspect being accessible to internally complementarily threaded nut means from the said outer end of said core tube, and the internal aspect of said screw thread engaging, formed on, and generally conforming to said screw thread form on said side surface of said top plug, and nut means, engaging said external aspect of said screw thread on said core tube and retaining said solenoid coil upon said core tube.

* * * * *